UNITED STATES PATENT OFFICE.

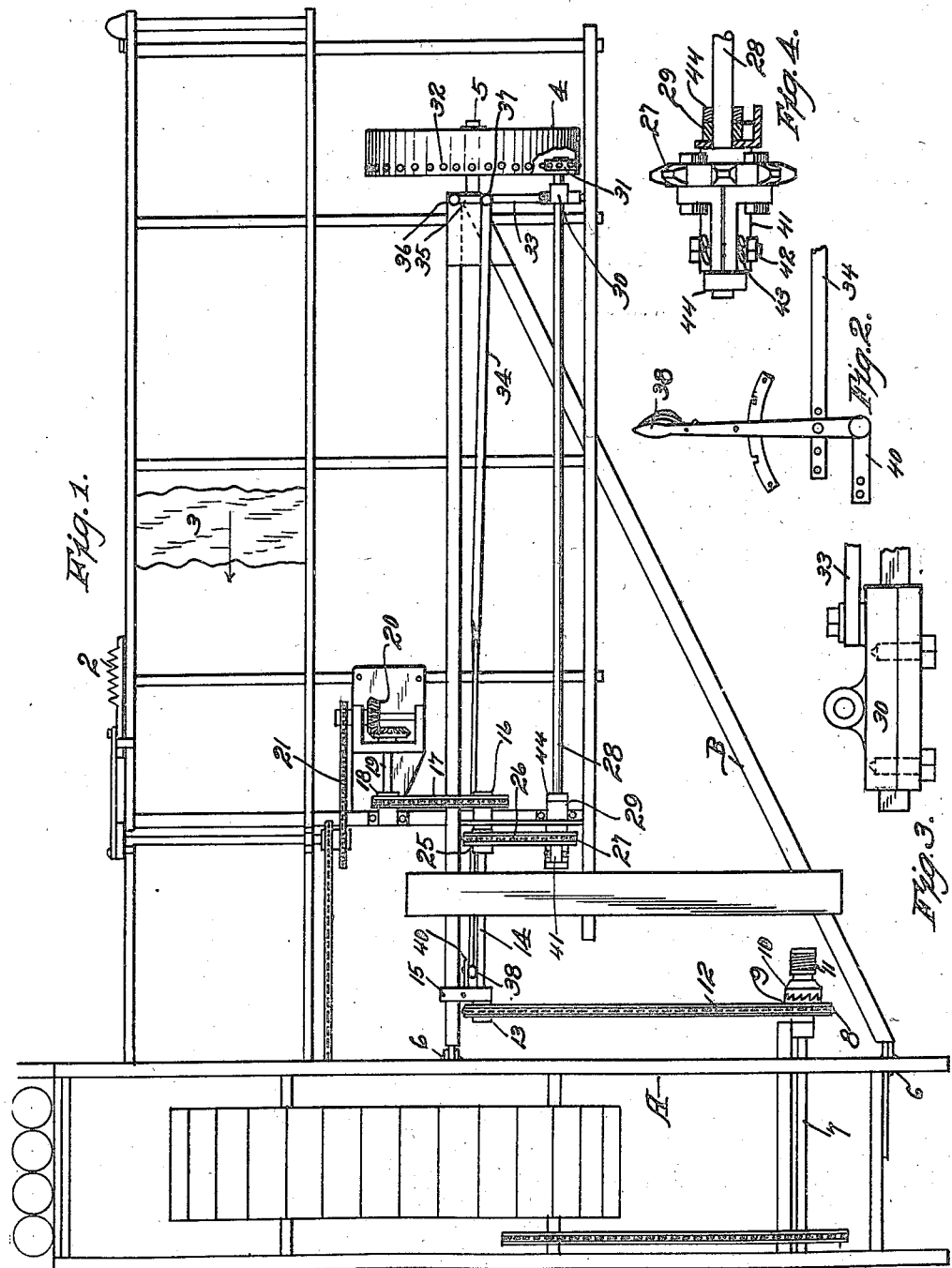
B. HOLT.
COMBINED HARVESTER.
APPLICATION FILED JULY 8, 1913.
1,224,114. Patented Apr. 24, 1917.

BENJAMIN HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

COMBINED HARVESTER.

1,224,114.   Specification of Letters Patent.   Patented Apr. 24, 1917.

Application filed July 8, 1913. Serial No. 777,848.

*To all whom it may concern:*

Be it known that I, BENJAMIN HOLT, a citizen of the United States, residing at Stockton, in the county of San Joaquin and State of California, have invented new and useful Improvements in Combined Harvesters, of which the following is a specification.

This invention relates to improvements in harvesters, and more particularly to that type of harvester wherein a header having cutting and conveying mechanisms is mounted on the side of the main harvester frame, and the entire arrangement travels as a combined harvester.

Harvesters of this type are great, lumbering machines, the header frame extending far out beyond the main frame, and under heavy traction conditions, for instance, when there is an extra heavy load on the header frame, or when the header frame is being driven along a hillside, it is most desirable that the header frame be positively driven forward. The reason for this is that the normal tendency of the header frame is to lag behind the main frame and act in the manner of a lever to swerve the main frame from its course, and this natural tendency of the header frame is greatly increased under heavy or unusual traction conditions such as described. The present invention provides an improved driving mechanism, whereby the header frame may be positively driven in a manner to overcome the lag or backward tendency of the header frame. Briefly stated, driving mechanism constructed in accordance with the invention is capable of driving the header frame at a speed in excess of the speed of the main frame, and to compensate for this excess in speed a slip drive connection is included in the driving mechanism. This permits an overbalance of power on the header frame which becomes effective when the slip of the header frame increases to a degree so as to cause it to drag behind the main frame, and accordingly, the header frame is impelled forward with an impulse sufficient to bring it up in line with the main frame. Under lighter traction conditions the slip drive connection is almost constantly operative to compensate for the excess in speed at which the header frame is driven, and, the header frame travels at substantially the same rate of speed as the main frame.

The invention also provides means for disconnecting the header support from its drive, without interfering with the cutting and conveying mechanisms, permitting the harvester to stand still or move backward while the cutting and conveying operation is carried on continuously.

A full understanding of the invention will be attained from the ensuing detail description taken in connection with the accompanying drawings, illustrating a construction embodying the invention in a preferred form and specifically pointed out in the appended claims.

In the drawings,—

Figure 1 is a plan view of the improved harvester;

Fig. 2 is a detail view of a manual device for controlling the driving support for the header frame;

Fig. 3 is a detail view of the sliding box; and

Fig. 4 is a detail view of the improved slip driving connection between the main frame and the driving support for the header frame.

Referring in detail to the drawings, in which similar characters of reference indicate similar parts throughout the several views, the main frame of a harvester of any description is indicated at A, to which is connected at one side the header frame B; this header frame carrying the usual cutters 2 and draper 3 by which the cut grain is delivered to the thresher cylinder, not shown, of a harvester. The header frame is provided with a driving support comprising in the preferred form a bearing wheel 4 mounted on a shaft 5 journaled in the frame. As shown, the header frame may be pivoted at 6 to the harvester frame.

The present invention resides primarily in the driving mechanism for the support or bearing wheel 4 of the header frame, which driving mechanism is constructed to drive the said bearing wheel in such manner that its speed will be increased, when the header frame drags or lags behind the harvester under heavy traction conditions. Under lighter or normal traction conditions, the slip drive connection, or compensating member will operate to permit a reduction of the speed of drive of the bearing wheel 4 to a speed approximately equal to that of the main frame. Mounted within the frame A is a power distributing member, preferably a shaft 7 which may receive power from any suitable source, for instance, the shaft 7 may represent the shaft for driving the driving support, or traction member, of the main harvester frame, or in case a horse drawn harvester is employed in realizing this invention, it may be a shaft receiving power from the said driving support. The shaft 7 carries a loose sprocket wheel 8 having a clutch member 9 engageable with the complementary clutch member 10, which is splined for sliding movement on the shaft 7, but turns with the shaft. A spring 11 normally holds the clutch members 9 and 10 in operative engagement to cause the sprocket 8 to turn with the shaft 7. The purpose of the arrangement is to disconnect the power from the sprocket wheel 8 when the harvester is backed, the clutch 10 slipping freely with relation to the sprocket wheel 8, under this condition, leaving the said sprocket wheel stationary.

From the sprocket wheel 8 extends a chain 12 which drives a sprocket wheel 13, mounted on a short counter shaft 14 journaled in suitable bearings 15 on the header frame B. The shaft 14 is also provided with a sprocket wheel 16 driving a sprocket chain 17 engaging a wheel 18 secured on a shaft 19, from which power is transmitted through suitable gearing 20 and a sprocket chain 21 to the cutter 2.

Mounted on the shaft 14 is a sprocket 25 which drives a sprocket chain 26 passing over another sprocket 27 on a shaft 28, journaled in suitable boxes 29 and 30 on the header frame B. Sprocket 27 is driven normally at a speed in excess of the traction member of the main frame and also in excess of the shaft 28. This is permitted by reason of the mounting of the sprocket 27 on the shaft 28, whereby said sprocket forms a compensating member, as hereinafter described. The box 30 is preferably slidable within the frame B for the purpose of shifting a driving pinion 31 on the shaft 28 into and out of engagement with perforations 32 in the rim of the driving support or bearing wheel 4 to connect and disconnect it from the shaft 28 and the driving means. As here shown, means is provided for manually shifting the box 30 and shaft 28. This consists of a link 33 connected to the outer end of a reciprocating bar 34 and to the swinging end of a short link 35 pivoted at 36. Links 33 and 35 are pivoted at 37 to the bar 34 and act in the manner of a toggle, so that when the bar 34 is moved, the box 30 will be shifted and with it the shaft 28 and pinion 31. As will be observed, this shifting of the shaft 28 is accomplished without interference with the operation of the cutting mechanism 2 and draper 3. For operating the rod 34 there is provided an adjustably connected hand lever 38 pivoted in a bracket 40 mounted on the header frame and preferably disposed adjacent to the harvester frame so that the operator of the harvester can conveniently control the transmission of power to the bearing wheel 4.

In describing the improved compensating member or slip driving connection which permits the header frame to be driven at a speed in excess of the harvester frame, under the hereinbefore described conditions, reference is particularly made to Fig. 4 of the drawing. As indicated therein the sprocket 27 is so mounted on the shaft 28 that it may be driven at a speed in excess of the desired speed of the shaft 28 and bearing wheel 4, this being effected by the provision of a slip connection between the sprocket wheel and the shaft. As shown in Fig. 4, the sprocket 27 is provided with a split hub 41 encircling shaft 28 and frictionally clamped thereon by any suitable means, such as the bolts 42 and interposed springs 43. The friction clamp of the sprocket on the shaft may be increased or decreased by correspondingly tightening or loosening the bolts 42. The sprocket 27 is held in place on the shaft 28 by suitable means as the clamp collars 44. It will thus be apparent that the sprocket 27 may be driven at a speed in excess of the desired speed of the wheel 4 and the friction grip of the sprocket hub on the shaft 28 is such that the slippage will normally permit the header frame to travel at the same rate of speed as the main frame. When the header frame drags the friction grip between shaft 28 and sprocket 27 is increased, thereby applying the excess of power to the bearing wheel 4 and giving the header frame a forward impulse to bring it in line with the main frame. In this manner the drag of the header frame is absorbed and the harvester is prevented from swerving from its course. At the same time this differential movement or yielding drive connection for the header frame bearing wheel will operate to prevent breakage due to excess loads, or sudden strains that may be temporarily put upon the header frame.

While I have shown and described a certain specific embodiment of my invention, it will be understood that the same is not to be limited thereto, as the invention is capable of wide modification and considerable variation, within the scope of the claims.

What is claimed is:

1. In a harvester, the combination of a main frame having a driving support, a header frame also having a driving support, driving connections for the header frame driving support adapted to drive the latter at a speed in excess of the main frame driving support, and means interposed in power transmitting relation in said driving connections for permitting the traction of the header frame driving support to equalize the speed of the latter with respect to the main frame driving support, whereby under normal traction conditions the two driving supports travel at substantially equalized speeds.

2. In a harvester, the combination of a main frame, a driving support for the main frame, a power shaft in driving relation with said driving support, a header frame, a driving support for the header frame, driving connections between said power shaft and the header frame driving support adapted to drive the latter at a speed in excess of the main frame driving support, and means interposed in power transmitting relation in said driving connections for permitting the traction of the header frame driving support to equalize the speed of the latter with respect to the main frame driving support, whereby under normal traction conditions, the two driving supports travel at substantially equalized speeds.

3. In a harvester, the combination of a main frame, a traction member forming the ground support for the main frame, a header frame, a bearing wheel journaled on the header frame, a power shaft driving said traction member, drive connections between said power shaft and the bearing wheel for driving the same at a speed in excess of the speed of the traction member, said drive connections including a slip sprocket operative to permit of a normal uniform speed of the bearing wheel relative to the traction member.

In testimony whereof I have hereunto set my hand in the presence of two subscribing witnesses.

BENJAMIN HOLT.

Witnesses:
R. E. MANN,
G. H. COWELL.